(12) United States Patent
Baillard et al.

(10) Patent No.: US 8,141,817 B2
(45) Date of Patent: Mar. 27, 2012

(54) TURBOJET SUSPENDED FROM AN AIRCRAFT MAST

(75) Inventors: Andre Bruno Denis Baillard, Bretteville du Grand Caux (FR); Pierre-Alain Jean-Marie Philippe Hugues Chouard, Paris (FR); Francois Raymond Conte, Tournefeuille (FR); Guillaume Lefort, Paris (FR)

(73) Assignees: SNECMA, Paris (FR); AIRCELLE, Gonfreville l'Orcher (FR)

( * ) Notice: Subject to any disclaimer, the term of this patent is extended or adjusted under 35 U.S.C. 154(b) by 713 days.

(21) Appl. No.: 12/275,815

(22) Filed: Nov. 21, 2008

(65) Prior Publication Data
US 2009/0134271 A1    May 28, 2009

(30) Foreign Application Priority Data

Nov. 23, 2007 (FR) ...................... 07 08231

(51) Int. Cl.
*B64D 27/00* (2006.01)
(52) U.S. Cl. .......... 244/53 R; 244/54; 248/554; 248/555
(58) Field of Classification Search ................ 244/53 R, 244/54; 248/554, 555
See application file for complete search history.

(56) References Cited

U.S. PATENT DOCUMENTS

| | | | |
|---|---|---|---|
| 4,079,981 A | 3/1978 | Mahler et al. | |
| 4,634,081 A | 1/1987 | Chee | |
| 5,238,206 A | 8/1993 | Pachomoff | |
| 5,873,547 A * | 2/1999 | Dunstan | 244/54 |
| 6,474,596 B1 | 11/2002 | Cousin et al. | |
| 6,494,403 B2 * | 12/2002 | Jule et al. | 244/54 |
| 6,843,449 B1 * | 1/2005 | Manteiga et al. | 244/54 |
| 7,021,585 B2 | 4/2006 | Loewenstein et al. | |
| 7,104,306 B2 * | 9/2006 | Huggins et al. | 164/47 |
| 7,448,573 B2 * | 11/2008 | Lafont et al. | 244/54 |
| 2004/0251381 A1 * | 12/2004 | Pasquer et al. | 244/54 |
| 2006/0219841 A1 * | 10/2006 | Dron et al. | 244/54 |
| 2007/0120010 A1 * | 5/2007 | Huggins et al. | 244/54 |
| 2008/0169377 A1 * | 7/2008 | Levert | 244/54 |

FOREIGN PATENT DOCUMENTS

| | | |
|---|---|---|
| EP | 0 527 672 A1 | 2/1993 |
| EP | 1 090 838 A1 | 4/2001 |
| EP | 1 486 418 A2 | 12/2004 |
| EP | 1 493 663 A1 | 1/2005 |
| GB | 2 010 969 A | 7/1979 |

OTHER PUBLICATIONS

U.S. Appl. No. 12/329,136, filed Dec. 5, 2008, Chouard, et al.

* cited by examiner

*Primary Examiner* — David H Bollinger
(74) *Attorney, Agent, or Firm* — Oblon, Spivak, McClelland, Maier & Neustadt, L.L.P.

(57) ABSTRACT

A turbojet suspended from an aircraft mast is disclosed. The turbojet includes a front fan, an intermediate casing downstream of the fan with an outer shroud and a hub connected together by radial arms, and an exhaust casing with an outer shroud, the two casings being aligned on one and the same axis XX. The mast includes a structural strut assembly of elongated shape. The strut assembly is attached upstream rigidly to the outer shroud of the intermediate casing by a front attachment including a device for transmitting the axial and lateral forces and downstream by a rear attachment to the exhaust casing.

14 Claims, 2 Drawing Sheets

TURBOJET SUSPENDED FROM AN AIRCRAFT MAST

The present invention relates to the field of gas turbine engines, in particular of turbojets with a front fan, and their coupling to an aircraft.

BACKGROUND OF THE INVENTION

A turbojet with a front fan comprises a large-diameter fan rotor housed in a casing onto which the air intake duct is mounted. An intermediate casing is placed immediately behind the fan casing. Downstream, the hub of the casing is extended by the casing of the main flow and consists of various compressor, combustion chamber, turbine and exhaust casings. The air entering via the air intake duct is compressed through the fan rotor then divided into two concentric cylindrical flows: a main flow and a bypass flow. The latter bypasses the engine and is discharged cold either in a separate flow or, after mixing with the main flow, downstream of the turbine stages. The main flow sustains an additional compression before being mixed with a fuel to produce hot gases in a combustion chamber. The hot gases supply the successive turbine stages which rotate the fan and the air compression stages about the axis of the engine. The main flow is then discharged to supply a portion of the thrust. The latter is produced mostly by the bypass flow. The ratio of the flow rates between the bypass and main flows is called the bypass ratio; the increase in engine power is bringing about the design of engines with a high bypass ratio for which the diameter ratio between the fan casing and the main flow casing is high.

DESCRIPTION OF THE PRIOR ART

The engines, according to a conventional coupling method, are attached to the aircraft, on or under the wing or to the fuselage, by means of a mast. The mast has the shape of an elongated and rigid strut assembly capable of transmitting the forces in three directions, axial, lateral and vertical, between the engine and the aircraft structure, the axis being that of the engine. The coupling of the engine to the mast is located in two vertical planes, a first plane at the front passing through the intermediate casing and at the rear passing through the exhaust casing. These two casings are structural elements of the engine supporting notably the respectively front and rear bearings. With respect to the front plane, two distinct coupling methods are currently used on civil aircraft, a first to the outer shroud of the intermediate casing, and a second at the hub.

With respect to the front coupling method, the subject of the present invention is an attachment via the outer shroud of the intermediate casing.

In the case of isostatic suspensions, the forces are transmitted by link rods or equivalent parts connecting the engine to the mast while being attached via links of the swivel type so as to work in traction and in compression only. The arrangement is designed to transmit the forces in three directions, axial Fx, vertical Fz and lateral Fy, and the moments in these three directions Mx, My and Mz respectively. In addition to the attachments between the intermediate and exhaust casings, the suspension also comprises link arms for transmitting or receiving thrust connecting the hub of the intermediate casing to the rear attachment, optionally to the mast in the vicinity of the rear attachment. The front suspension plane, usually situated on the intermediate casing, receives lateral and vertical forces, the rear suspension plane receives lateral and vertical forces and the moment about the engine axis. The lateral and vertical moments are received by the reactions in opposite directions of the two suspension planes.

The problems associated with the coupling of the engines are the distortions of the casings, on the one hand those resulting from the occasional transmissions of the forces, the attachment points of the link arm and clevis type forming zones of small extent, on the other hand those resulting from the transfer of the acceptance of thrust to the mast relative to the thrust vector along the engine axis. The torque formed by the two forces induces a flexing of the engine along its axis which adversely affects the clearances between the fixed and rotating portions with deterioration of performance and an impact on specific consumption. A further result is wear of the parts by friction and a reduced service life of the engine. The phenomenon is all the more marked with greater amplitudes of deformations on the engines with a high bypass ratio and with a greater diameter ratio between the fan casing and the main flow casing.

SUMMARY OF THE INVENTION

The subject of the present invention is therefore a suspension of a turbojet with front fan to a mast which transmits forces to the latter without locally or generally deforming cylindrical casings containing rotating parts. A further subject is an optimal weight suspension. Finally the suspension must not adversely affect accessibility and maintenance.

These objectives are achieved, according to the invention, with a turbojet suspended from an aircraft mast, the turbojet comprising a front fan, an intermediate casing downstream of the fan with an outer shroud and a hub connected together by radial arms and an exhaust casing with an outer shroud, the two casings being aligned on one and the same axis XX, the mast comprising a structural strut assembly of elongated shape. In said turbojet said strut assembly is attached upstream rigidly to the outer shroud of the intermediate casing by an attachment comprising a means for transmitting the axial and lateral forces and downstream by an attachment to said exhaust casing.

The invention is based on the feature by which the main path of the forces in normal operation of the engine to the mast passes through the front of the engine and thereby reduces the forces passing between the front and the rear of the engine. The forces in question are notably thrust, gravity and the aerodynamic air intake duct forces.

Furthermore, patent application WO2007/033994 is known relating to a suspension that is directed, as in the present application, to reducing or removing the framework distortion effects and in particular the longitudinal flexing due to the thrust of the engine. However, according to the solution presented in this document, the rear coupling of the engine is explicitly excluded, which implies greatly accentuated distortions under gravity and does not seem to satisfactorily solve the problem of the distortions on the casing. Furthermore, relative to this solution, the invention makes it possible to receive the torque Mz, about the vertical direction, between the front and rear planes, which makes it possible to reduce the importance of the front attachment to an occasional acceptance of forces if necessary.

The turbojet also comprises the following features taken in isolation or in combination:

Said means for transmitting the axial forces is a shear pin.
The front attachment comprises an upstream plate secured to the strut assembly. This plate may or may not be bolted onto the outer shroud of the intermediate casing.

The front attachment comprises at least one link rod on each side of the strut assembly connected laterally to the outer shroud of the intermediate casing and arranged so as to transmit only traction or compression forces.

More particularly, the front attachment comprises a pair of link rods on each side of the strut assembly connected to the outer shroud of the intermediate casing, each of the link rods being arranged so as to transmit only traction or compression forces.

The turbojet comprises two link arms for transmitting thrust connected upstream to the hub of the intermediate casing and downstream to the rear attachment or else to the mast directly.

The rear attachment to the exhaust casing is of the flexible type and more particularly the flexible attachment comprises two mounts transmitting the vertical forces and a mount transmitting the lateral forces.

Alternatively, the rear attachment to the exhaust casing is of the rigid type and more particularly the rear attachment to the exhaust casing comprises a transverse beam connected to the outer shroud of the exhaust casing by at least two link rods attached via swivel links.

According to a particular embodiment, the strut assembly comprises upstream a set of three rigid arms attached at three points to the outer shroud of the intermediate casing. The rigid arms may be attached to the outer shroud of the intermediate casing via swivel links.

BRIEF DESCRIPTION OF THE DRAWINGS

The invention will now be described in greater detail, the described embodiments not being limiting; they are described with reference to the appended drawings in which.

DESCRIPTION OF THE PREFERRED EMBODIMENTS

Figure 1:
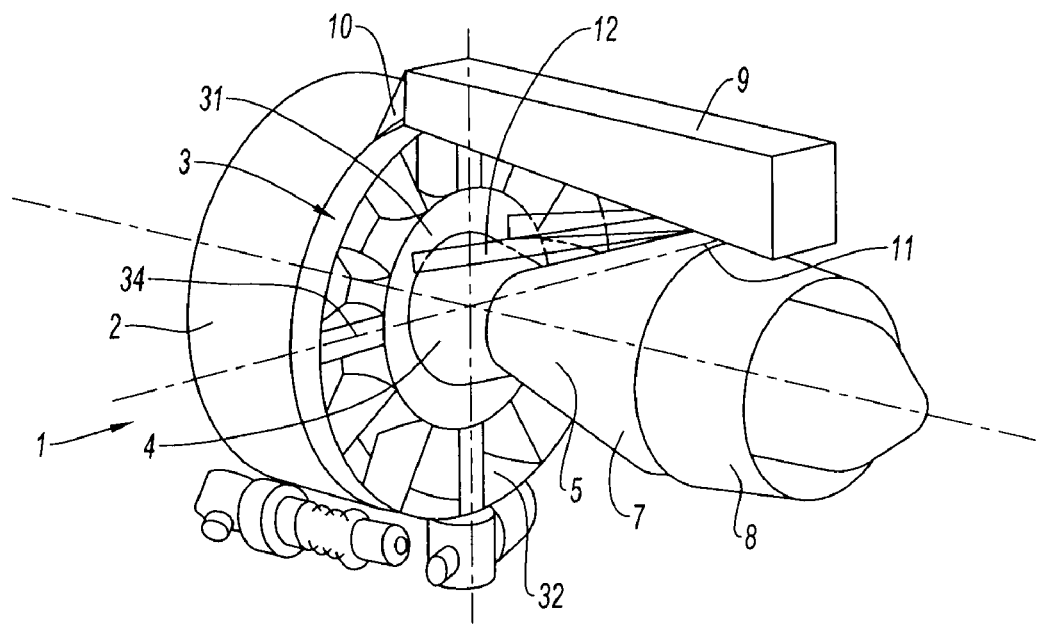
FIG. 1 represents schematically and in perspective a turbojet suspended from a mast according to the invention.
Figure 2:
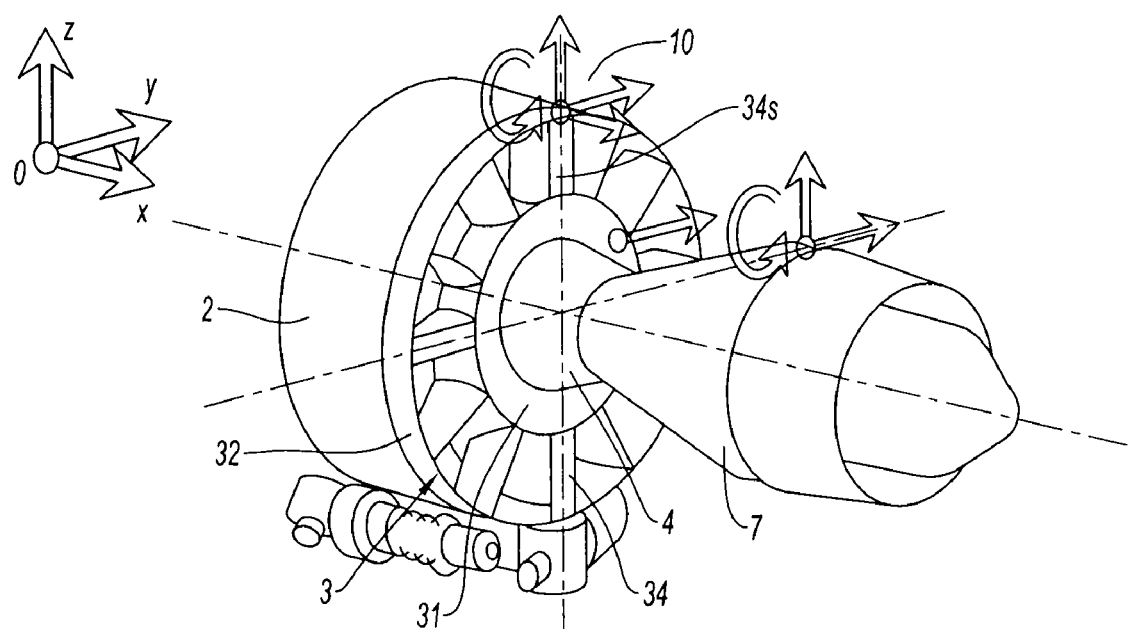
FIG. 2 represents the engine with the distribution of the forces on the main axes.

As can be seen in FIGS. 1 and 2, the turbojet 1 is of the type with a front turbofan whose casing 2 has been shown, downstream of which there is the intermediate casing 3. The upstream end, corresponding to the air intake, is on the left relative to the figure.

Downstream, there is the casing 4 of the compression section. This section communicates with the combustion chamber 5 of the annular type. The turbine stages 7 are situated downstream of the combustion chamber. The engine ends with the exhaust casing 8, a structural part known per se, which, like the intermediate casing, comprises a hub supporting bearings, an outer shroud and radial arms for transmitting forces between the hub and the outer shroud.

The coordinate system, relative to which the axes and the components of the forces and moments are oriented, comprises the axis Ox parallel to the axis XX of the engine, the latter being assumed to be horizontal and oriented from upstream to downstream; the axis Oz is the vertical axis and the axis Oy is the transverse axis.

The engine is attached to the structure of the aircraft, wing or fuselage, by means of a mast 9, as is known. The general shape of the latter is that of a rigid parallelepipedal strut assembly. It transmits all force between the engine and the structure.

The suspension which is all the parts or members attaching the engine and transmitting the forces between the engine and the mast, comprises a front attachment 10 between the outer shroud of the intermediate casing 3 and the mast 9, a rear attachment 11 between the outer shroud of the exhaust casing 8 and the mast, and two link arms 12 for accepting or transmitting thrust.

According to the invention, the upstream attachment 10 is arranged to receive the forces Fx in the direction Ox, Fy in the direction Oy, Fz in the direction Oz and at least a portion of the moment Mx about the direction Ox.

The rear attachment 11 is arranged to receive the forces Fy in the direction Oy and the forces Fz in the direction Oz, and a portion of the axial moment Mx.

The link arms 12 for receiving thrust are arranged to receive a portion of the forces Fx in the direction Ox. They are attached upstream to the hub 31 of the intermediate casing, on either side of the vertical plane (Ox, Oz) passing through the axis XX of the engine; downstream they are attached directly to the strut assembly 9 of the mast. They may also be attached to the rear attachment beam which connects the exhaust casing to the mast, if necessary via a bar.

Therefore the suspension has a main force path around the intermediate casing with a passage through the outer shroud 32 of the intermediate casing.

Figure 3:
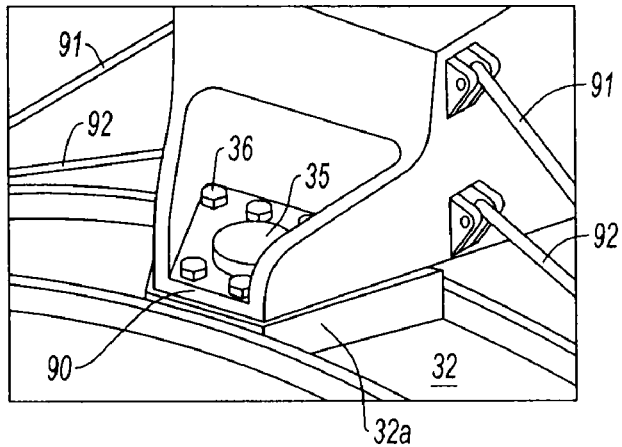
FIG. 3 represents, seen in front isometric perspective, a detail of the upstream attachment of the strut assembly on the outer shroud of the intermediate casing.
Figure 4:
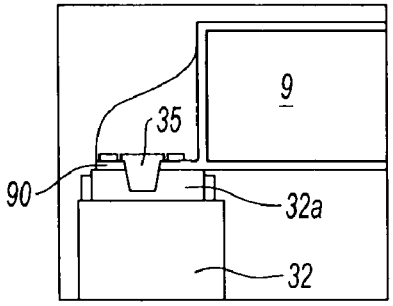
FIG. 4 shows an axial section of the plane of connection between the strut assembly and the shroud.

FIGS. 3 and 4 represent an example of upstream attachment 10 whose main function is to receive the axial forces. The upstream end of the strut assembly 9 comprises a plate 90 in the plane (Ox; Oy) which rests on a base 32a secured to the outer shroud 32 of the intermediate casing 3. The plate and the base are traversed, on the axis Oz, by a shear pin 35. The function of the shear pin is to form a means of transmitting the axial forces between the shroud 32 and the strut assembly 9. In this instance bolts 36 hold the plate tight against the base 32a and receive a portion of the vertical forces. Because the thrust forces are transmitted via the shroud 32, the latter is reinforced appropriately, for example by a bolted beam in an arc of a circle. The axial forces originating from the thrust on the axis of the engine are transferred to the mast 9 via a rigid radial arm 34 of the intermediate casing.

Note that the intermediate casing 3 is a structural part of the engine with a hub 31 inside which the front bearings supporting the coaxial shafts of the rotors are mounted. For example, in a twin-spool engine with a front fan and two coaxial shafts for the low-pressure and high-pressure rotors, the hub contains the three front bearings of the engine. The outer shroud 32 is connected to the hub by radial arms of which a portion is structural and arranged to transmit the forces between the two parts, hub and outer shroud. The top radial arm 34s at 12 o'clock is designed to permanently transmit the thrust between the hub and the outer shroud at the location of attachment of the strut assembly 9.

Solutions other than the shear pin are also possible.

The lateral forces are received by a system of dual-swiveled link rods. According to one embodiment, there are two links rods 91 and 92 in a V shape whose point is attached by a fitting to the outer shroud 32 of the intermediate casing. The attachments are made by swivel links as is known per se so as to transmit only forces that are in the axis of the link arm. The V formed by the link rods is contained in a vertical plane perpendicular to the axis of the engine. Therefore each pair of link rods in a V formation receives no force in the direction of the engine axis.

With reference to the rear attachment 11, two variants are possible.

Figure 5:
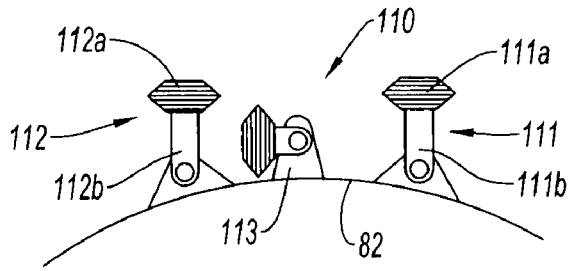
FIG. 5 shows the diagram of a flexible attachment between the strut assembly of the mast and the exhaust casing.

According to a first embodiment represented in FIG. 5, the rear attachment is of the flexible type 110 with two mounts 112 and 111 to receive vertical forces. The two mounts are placed in a plane that is transverse relative to the axis on either side of the vertical plane which passes through this axis. The mounts comprise an elastomer portion 112a, 111a connected to the strut assembly not shown in the figure and a link arm 112b, 111b connected via an attachment of the swivel type to the outer shroud 82 of the exhaust casing 8. The mounts whose stiffness is controlled are made of elastomer or any other flexible composite material.

To receive a portion of the moment Mx about the axis XX, a third mount 113 is placed between the first two with a tangential link.

Figure 6:
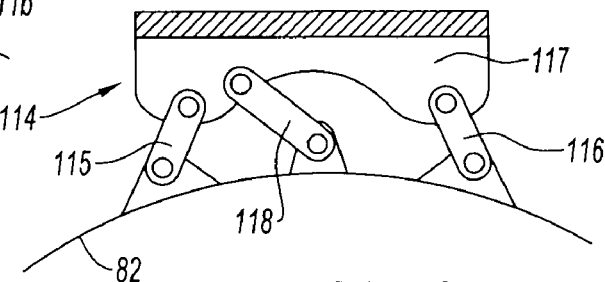
FIG. 6 shows the diagram of a rigid attachment between the strut assembly of the mast and the exhaust casing.

According to another embodiment shown in FIG. 6, the attachment 114 is rigid with two lateral link rods 115 and 116 attached via swivel links between the outer shroud 82 of the exhaust casing 8 and a beam 117 that is transverse relative to the axis XX which is attached rigidly to the strut assembly 9. To receive a portion of the moment Mx, a third link rod 118 is attached tangentially between the shroud 82 and the beam 117.

Figure 7:
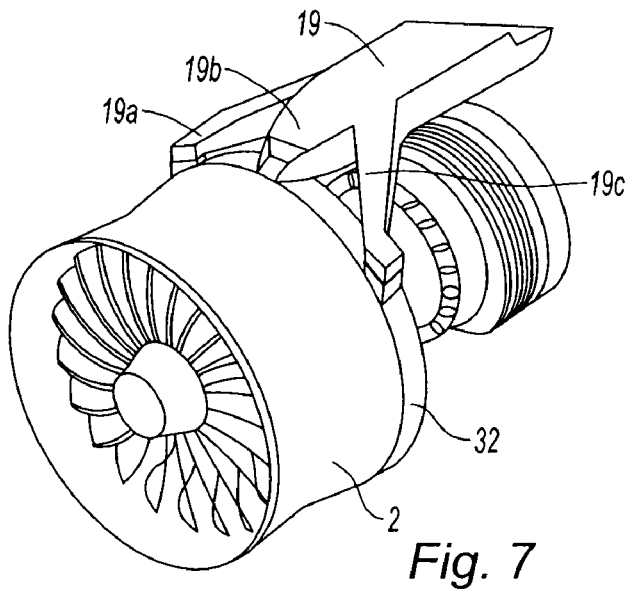
FIG. 7 shows a variant embodiment of the attachment to the shroud of the intermediate casing.

According to a variant shown in FIG. 7, the strut assembly 19 comprises three upstream structural branches 19a, 19b and 19c. The end of each branch is connected to the outer shroud of the intermediate casing by a link like that shown in FIG. 3.

The invention claimed is:
1. A turbojet suspended from an aircraft mast,
the turbojet comprising
a front fan casing,
an intermediate casing downstream of the fan casing with an outer shroud and a hub connected together by radial arms, and
an exhaust casing with an outer shroud, the two casings being aligned on one and the same axis XX,
the mast comprising a structural strut assembly of elongated shape,
wherein said strut assembly is attached upstream rigidly to the outer shroud of the intermediate casing by a front attachment comprising a means for transmitting axial and lateral forces and downstream by a rear attachment to said exhaust casing, the front attachment of the strut assembly receives forces in an axial direction parallel to the axis XX, in a vertical direction which is perpendicular to the axial direction, in a transverse direction which is perpendicular to both the axial direction and the vertical direction, and receives a moment about the axial direction, and
wherein the front attachment includes a horizontal plate in a plane defined by the axial and transverse directions which rests on a base secured to the outer shroud of the intermediate casing, a shear pin which extends in the vertical direction and transverses the plate and the base, and a pair of link rods in a V-shape, first ends of the link rods presenting an apex of the V-shape being attached by a fitting to the outer shroud of the intermediate casing.

2. The turbojet as claimed in claim 1, wherein said plate secured to the strut assembly is bolted onto the outer shroud of the intermediate casing.

3. The turbojet as claimed in claim 1, wherein the pair of link rods is arranged so as to transmit only traction or compression forces.

4. The turbojet suspended from an aircraft mast as claimed in claim 1, wherein the strut assembly comprises upstream a set of three rigid arms attached at three points to the outer shroud of the intermediate casing.

5. The turbojet suspended from an aircraft mast as claimed in claim 4, wherein the rigid arms are attached to the outer shroud of the intermediate casing via swivel links.

6. The turbojet suspended from an aircraft mast as claimed in claim 1, further comprising two link arms for transmitting thrust connected upstream to the hub of the intermediate casing and downstream to the rear attachment.

7. The turbojet suspended from an aircraft mast as claimed in claim 1, further comprising two link arms for transmitting thrust connected upstream to the hub of the intermediate casing and downstream to the mast.

8. The turbojet suspended from an aircraft mast as claimed in claim 1, wherein the rear attachment to the exhaust casing is flexible.

9. The turbojet suspended from an aircraft mast as claimed in claim 8, wherein the flexible attachment comprises two mounts transmitting vertical forces.

10. The turbojet suspended from an aircraft mast as claimed in claim 9, wherein the flexible attachment comprises a mount transmitting lateral forces.

11. The turbojet suspended from an aircraft mast as claimed in claim 1, wherein the rear attachment to the exhaust casing is rigid.

12. The turbojet suspended from an aircraft mast as claimed in claim 11, wherein the rear attachment to the exhaust casing comprises a transverse beam connected to the outer shroud of the exhaust casing by at least two link rods attached via swivel links.

13. The turbojet suspended from an aircraft mast as claimed in claim 1, wherein the outer shroud of the intermediate casing is reinforced by a bolted beam in an arc of a circle.

14. The turbojet suspended from an aircraft mast as claimed in claim 1, wherein the pair of link rods is contained in a vertical plane defined by the vertical and transverse directions.

* * * * *